(12) United States Patent
Akiyama et al.

(10) Patent No.: US 12,176,784 B2
(45) Date of Patent: Dec. 24, 2024

(54) MAGNETIC FIELD APPARATUS AND LINEAR MOTOR

(71) Applicant: FUJI ELECTRIC CO., LTD., Kanagawa (JP)

(72) Inventors: Terukazu Akiyama, Tokyo (JP); Satoshi Imamori, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 220 days.

(21) Appl. No.: 18/057,945

(22) Filed: Nov. 22, 2022

(65) Prior Publication Data

US 2023/0238869 A1 Jul. 27, 2023

(30) Foreign Application Priority Data

Jan. 24, 2022 (JP) .................. 2022-008545

(51) Int. Cl.
*H02K 41/03* (2006.01)
*H02K 1/12* (2006.01)

(52) U.S. Cl.
CPC ............. *H02K 41/033* (2013.01); *H02K 1/12* (2013.01)

(58) Field of Classification Search
CPC ....... H02K 41/031; H02K 41/02; H02K 41/03
See application file for complete search history.

(56) References Cited

U.S. PATENT DOCUMENTS

| | | | |
|---|---|---|---|
| 2002/0081220 A1 | 6/2002 | Ota et al. | |
| 2011/0012440 A1* | 1/2011 | Toyota | H02K 1/2792 310/152 |
| 2012/0049657 A1* | 3/2012 | Shikayama | H02K 41/03 310/12.25 |
| 2013/0127285 A1 | 5/2013 | Yano | |
| 2022/0376571 A1* | 11/2022 | Sato | H02K 15/03 |

FOREIGN PATENT DOCUMENTS

| | | |
|---|---|---|
| JP | 2002-199695 | 7/2002 |
| JP | 2007-006545 | 1/2007 |
| JP | 2010-063201 | 3/2010 |

(Continued)

OTHER PUBLICATIONS

Office Action mailed on Apr. 19, 2022 issued with respect to the basic Japanese Patent Application No. 2022-008545.

*Primary Examiner* — Leda T Pham

(74) *Attorney, Agent, or Firm* — IPUSA, PLLC

(57) ABSTRACT

A magnetic field apparatus includes a main magnet that generates a magnetic field with respect to an armature, a member made of a soft magnetic material and disposed adjacent to an end surface of the main magnet on a side opposing the armature, an auxiliary magnet that increases a magnetic flux of a magnetic pole of the main magnet on the side opposing the armature and disposed adjacent to the main magnet and the member in a relative moving direction between the magnetic field apparatus and the armature, and a restricting part that restricts the magnetic flux of the main magnet passing through an end surface of the member along a third direction that is perpendicular to both a first direction in which the main magnet and the armature oppose each other, and a second direction corresponding to the relative moving direction between the magnetic field apparatus and the armature.

9 Claims, 9 Drawing Sheets

(56) References Cited

FOREIGN PATENT DOCUMENTS

| JP | 2011-024379 | 2/2011 |
| JP | 2011-067030 | 3/2011 |
| JP | 2012-039687 | 2/2012 |
| JP | 2012-050180 | 3/2012 |
| JP | 2020-156259 | 9/2020 |

\* cited by examiner

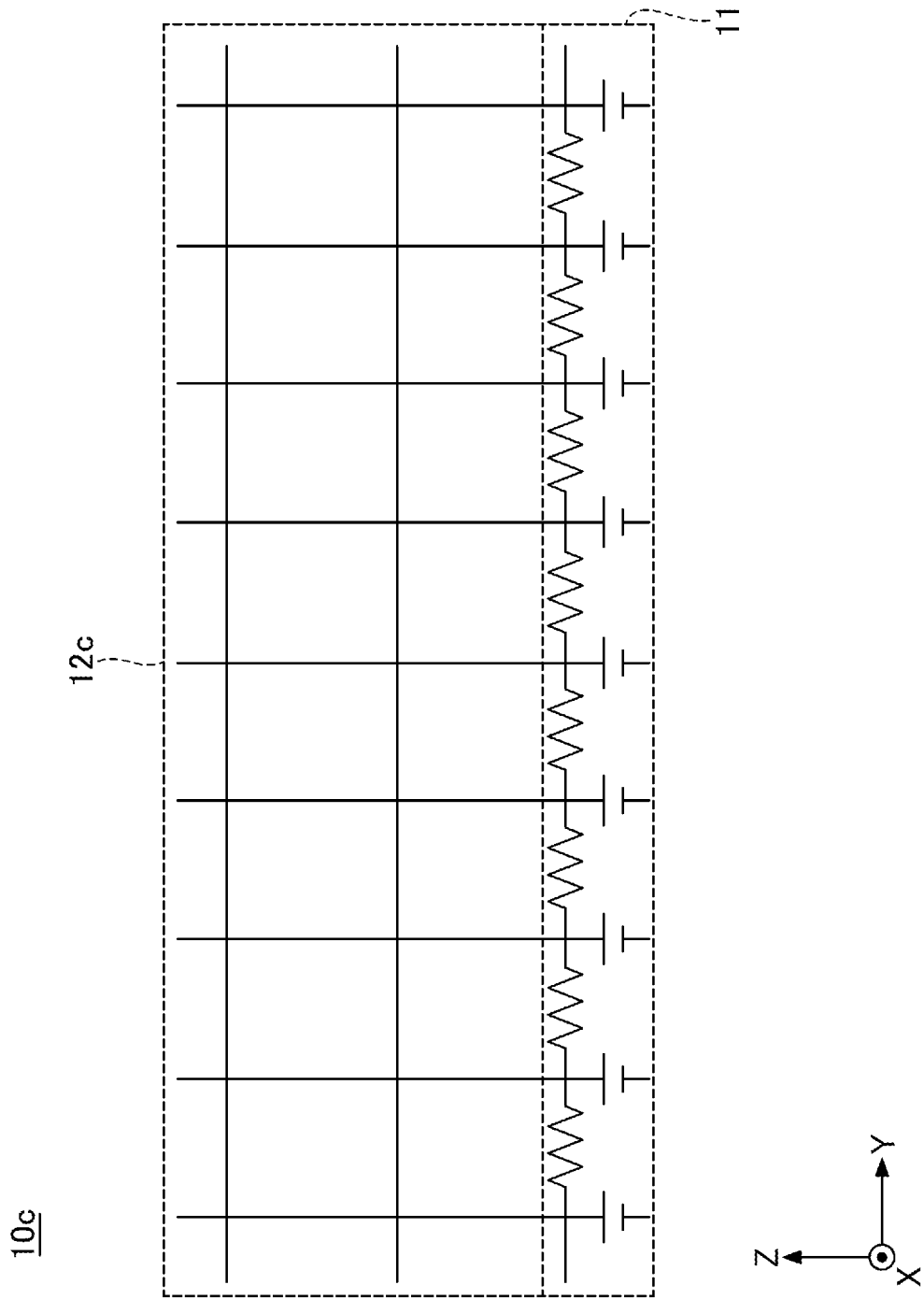

MAGNETIC FIELD APPARATUS AND LINEAR MOTOR

CROSS-REFERENCE TO RELATED APPLICATIONS

This application is based upon and claims priority to Japanese Patent Application No. 2022-008545, filed on Jan. 24, 2022, the entire contents of which are incorporated herein by reference.

FIELD

Certain aspects of the embodiments discussed herein are related to magnetic field apparatuses, and linear motors.

BACKGROUND

For example, there is known a magnetic field apparatus (or a permanent magnet field system) having a Halbach array that uses a main magnet opposing an armature, and an auxiliary magnet for increasing a magnetic flux of a magnetic pole at a surface of the main magnet opposing the armature, as proposed in Japanese Laid-Open Patent Publication No. 2007-006545, for example.

In the magnetic field apparatus proposed in Japanese Laid-Open Patent Publication No. 2007-006545, a member made of a soft magnetic material is disposed adjacent to an end surface of the main magnet opposing the armature, and an auxiliary magnet is provided adjacent to end surfaces of the main magnet and the member made of the soft magnetic material along a relative moving direction between the armature and the magnetic field apparatus. Hence, magnetic saturation of a magnetic circuit can be reduced, and the torque and thrust of a motor can be improved, by the action of the member made of the soft magnetic material.

However, according to the configuration of the magnetic field apparatus proposed in Japanese Laid-Open Patent Publication No. 2007-006545, a leakage magnetic flux may be generated through one side surface of the member made of the soft magnetic material, along a direction perpendicular to another side surface of the member made of the soft magnetic material and adjacent to the auxiliary magnet. For this reason, there is room for further improvement from a viewpoint of improving the torque and thrust of the motor.

SUMMARY

It is one object of embodiments of the present disclosure to provide a technique capable of further improving the torque and thrust of a motor.

One aspect of the embodiments of the present disclosure provides a magnetic field apparatus including a main magnet configured to generate a magnetic field with respect to an armature; a predetermined member, made of a soft magnetic material, and disposed adjacent to an end surface of the main magnet on a side opposing the armature; an auxiliary magnet, configured to increase a magnetic flux of a magnetic pole of the main magnet on the side opposing the armature, and disposed adjacent to the main magnet and the predetermined member in a relative moving direction between the magnetic field apparatus and the armature; and a restricting part configured to restrict the magnetic flux of the main magnet passing through an end surface of the predetermined member along a third direction that is perpendicular to both a first direction in which the main magnet and the armature oppose each other, and a second direction corresponding to the relative moving direction between the magnetic field apparatus and the armature.

Another aspect of the embodiments of the present disclosure provides a linear motor including the magnetic field apparatus described above; and the armature.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF DRAWINGS

FIG. 9 is a magnetic circuit diagram schematically illustrating the magnetic action of the magnetic field system according to the comparative example.

DESCRIPTION OF EMBODIMENTS

Figure 1:
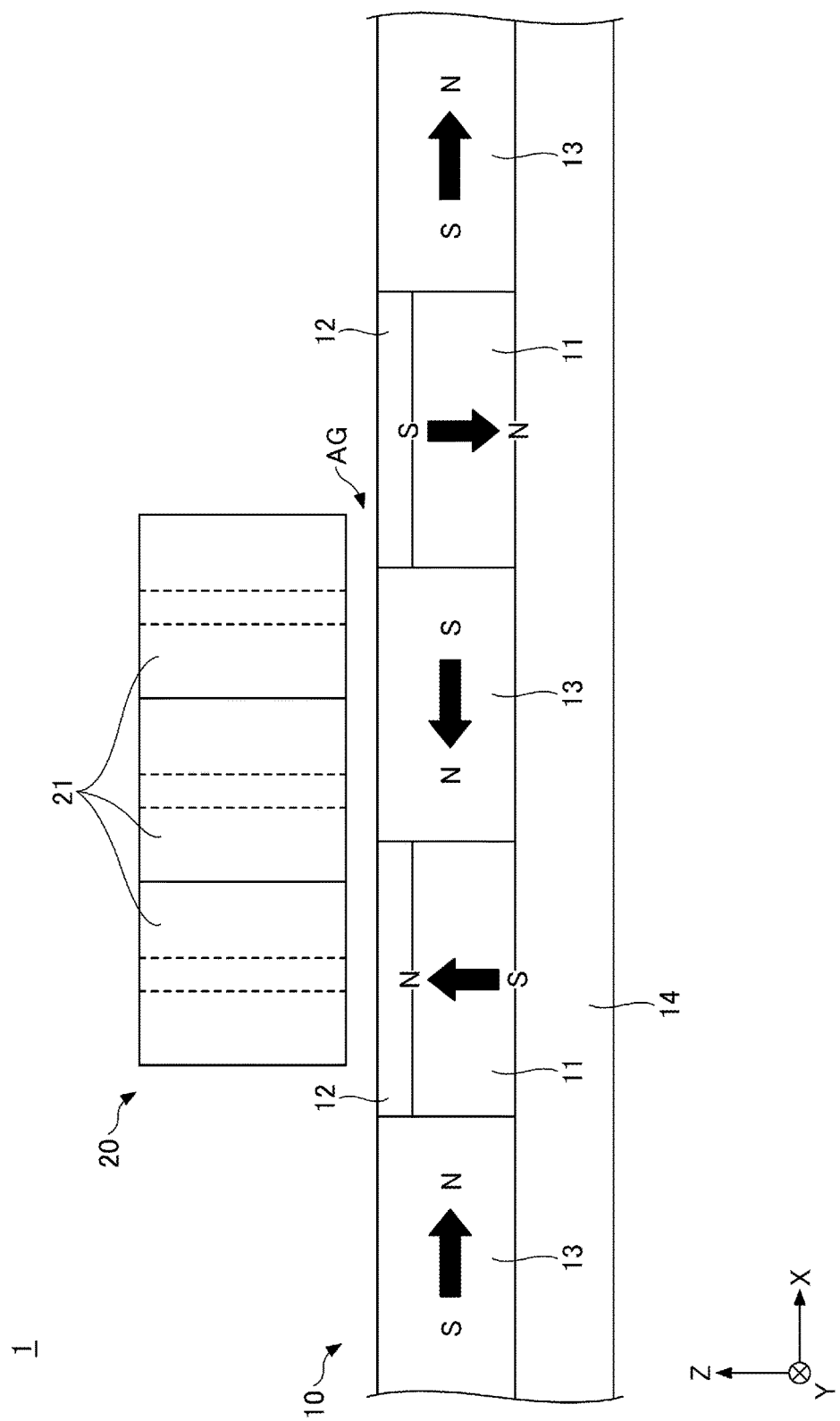
FIG. 1 is a side view illustrating a first example of a linear motor.

Preferred embodiments of the present disclosure will be described with reference to the accompanying drawings. In the drawings, those parts that are the same are designated by the same reference numerals, and a repeated description of the same parts may be omitted.

First Example of Linear Motor

A first example of a linear motor 1 according to the present embodiment will be described, with reference to FIG. 1 through FIG. 3.

FIG. 1 is a side view illustrating the first example of the linear motor 1. FIG. 2 is a front cross sectional view illustrating a first example of the a magnetic field system 10. FIG. 3 is a magnetic circuit diagram schematically illustrating a magnetic action of the first example of the magnetic field system 10.

In the following description, an orthogonal coordinate system defined by an X-axis, a Y-axis, and a Z-axis in the drawings may be used. Further, a positive X-axis direction and a negative X-axis direction may be generally referred to as an X-axis direction, which is an example of a second direction. A positive Y-axis direction and a negative Y-axis direction may be generally referred to as a Y-axis direction, which is an example of a third direction. A positive Z-axis direction and a negative Z-axis direction may be generally referred to as a Z-axis direction, which is an example of a first direction.

The linear motor 1 according to the present embodiment may be incorporated in an opening and closing mechanism of various sliding doors, such as doors of railway vehicles, and platform doors of railway stations, or the like, for example. In addition, the linear motor 1 according to the present embodiment may be attached to a semiconductor manufacturing apparatus or the like, for example.

Configuration of Linear Motor

As illustrated in FIG. 1, the linear motor 1 includes the magnetic field system 10, and an armature 20. In FIG. 1, arrows indicated on the magnetic field system 10 indicate magnetization directions of magnet members, such as the main magnet 11 and an auxiliary magnet 13. The same applies to FIG. 4 and FIG. 7 which will be described later.

The magnetic field system 10 is an example of a magnetic field apparatus. The magnetic field system 10 is a permanent magnet field system, opposing the armature 20 in the Z-axis direction, and generating a magnetic field interlinking with the armature 20. In this example, the magnetic field system 10 is a stator.

Figure 2:
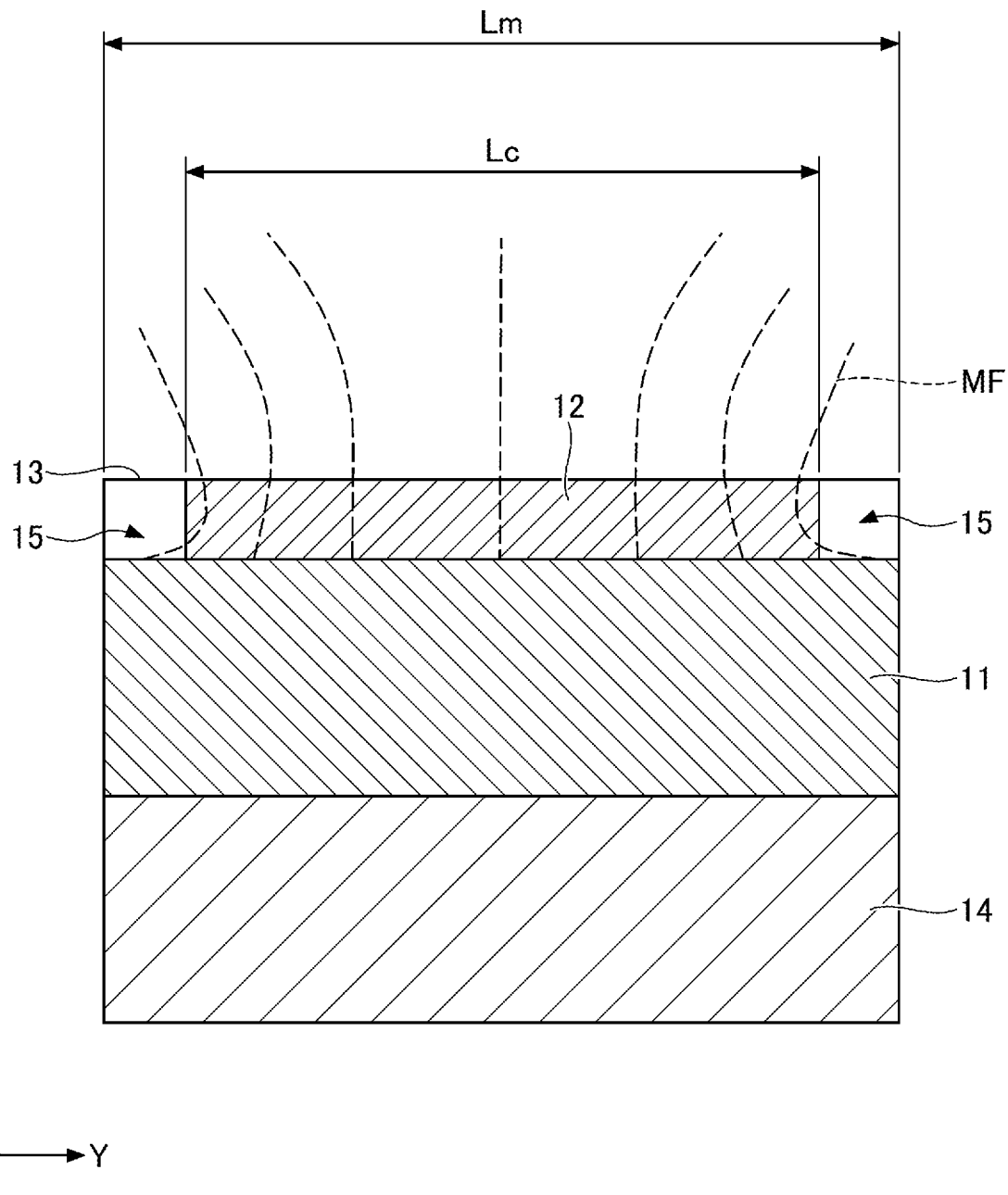
FIG. 2 is a front cross sectional view illustrating a first example of a magnetic field system.

As illustrated in FIG. 1 and FIG. 2, the magnetic field system 10 has a Halbach array, and includes the main magnet 11, a soft magnetic member 12, the auxiliary magnet 13, and a back yoke 14.

The main magnet 11 is magnetized (or subjected to magnetization) in the positive Z-axis direction or the negative Z-axis direction, and generates a magnetic flux interlinking with the armature 20. The main magnet 11 may be formed of a neodymium sintered magnet, a ferrite magnet, or the like, for example. The main magnet 11 has an approximately rectangular parallelepiped shape defined by sides extending along the X-axis, the Y-axis, and the Z-axis, respectively. The term "approximately" is intended to tolerate a manufacturing error or the like, for example, and is used to mean the same hereinafter.

In this example, a plurality of main magnets 11 are provided. The plurality of main magnets 11 are arranged in the X-axis direction with the auxiliary magnet 13 sandwiched between two adjacent main magnets 11, so that polarities of magnetic poles at end surfaces of the plurality of main magnets 11 along the positive Z-axis direction are alternately switched, that is, so that magnetizing directions (or magnetization directions) are alternately switched.

The soft magnetic member 12 is an example of a predetermined member, and may be made of a soft magnetic material. In this example, a plurality of soft magnetic members 12, equal to the number of main magnets 11, is provided. The soft magnetic members 12 are disposed adjacent to the end surfaces of the main magnets 11 along the positive Z-axis direction, respectively. The soft magnetic material may be pure iron, mild steel, silicon steel plate, or the like, for example.

The soft magnetic member 12 has an approximately rectangular parallelepiped shape defined by sides extending along the X-axis, the Y-axis, and the Z-axis, respectively. As illustrated in FIG. 1, a length of the soft magnetic member 12 along the X-axis direction is approximately the same as that of the main magnet 11. The soft magnetic member 12 is disposed so that both end surfaces of the main magnet 11 and the soft magnetic member 12 along the positive X-axis direction and the negative X-axis direction, respectively, are located at positions that approximately coincide in the X-axis direction. In addition, as illustrated in FIG. 2, a length Lc of the soft magnetic member 12 along the Y-axis direction is smaller than a length Lm of the main magnet 11 along the Y-axis direction, that is, Lc<Lm. Further, both end surfaces of the soft magnetic member 12 along the positive Y-axis direction and the negative Y-axis direction are disposed on inner sides of both end surfaces of the main magnet 11 along the positive Y-axis direction and the negative Y-axis direction, respectively. For this reason, spaces 15 are provided adjacent to both end surfaces of the soft magnetic member 12 along the positive Y-axis direction and the negative Y-axis direction, and adjacent to an end surface of the main magnet 11 along the positive Z-axis direction. The spaces 15, in which no member is provided (that is, free of any member), are an example of a restricting part.

The auxiliary magnet 13 is disposed adjacent to the main magnet 11 and the soft magnetic member 12 along the X-axis direction. The auxiliary magnet 13 is magnetized (or subjected to magnetization) in the positive X-axis direction or the negative X-axis direction, and increases the magnetic flux of the magnetic pole at the surface of the adjacent main magnet 11 opposing the armature 20, that is, the magnetic flux of the magnetic pole in the positive Z-axis direction. More particularly, when the adjacent main magnet 11 is magnetized (or subjected to magnetization) in the positive Z-axis direction, the auxiliary magnet 13 is magnetized (or subjected to magnetization) in one of the positive X-axis direction and the negative X-axis direction, toward the main magnet 11. On the other hand, when the adjacent main magnet 11 is magnetized (or subjected to magnetization) in the negative Z-axis direction, the auxiliary magnet 13 is magnetized (or subjected to magnetization) in one of the positive X-axis direction and the negative X-axis direction, away from the main magnet 11. The auxiliary magnet 13 may be formed of a neodymium sintered magnet, a ferrite magnet, or the like, for example.

The auxiliary magnet 13 has an approximately rectangular parallelepiped shape defined by sides extending along the X-axis, the Y-axis, and the Z-axis, respectively. As illustrated in FIG. 1 and FIG. 2, a length of the auxiliary magnet 13 along the Z-axis direction is approximately the same as a sum of the lengths of the main magnet 11 and the soft magnetic member 12 along the Z-axis direction. Moreover, the auxiliary magnet 13 is disposed so that the positions of the end surfaces of the auxiliary magnet 13 and the main magnet 11 along the negative Z-axis direction approximately coincide with each other, and the positions of the end surfaces of the auxiliary magnet 13 and the soft magnetic member 12 along the positive Z-axis direction approximately coincide with each other.

The back yoke 14 is used as a magnetic path among the main magnets 11 arranged along the X-axis direction. The back yoke 14 is provided so as to be adjacent to the end surfaces of the main magnet 11 and the auxiliary magnet 13 along the negative Z-axis direction, and to extend in the X-axis direction. The back yoke 14 may be made of a soft magnetic material, such as pure iron, mild steel, silicon steel plate, powder magnetic core, or the like, for example.

The back yoke 14 has an approximately rectangular parallelepiped shape defined by sides extending along the X-axis, the Y-axis, and the Z-axis, respectively. As illustrated in FIG. 1 and FIG. 2, a length of the back yoke 14 along the Y-axis direction is approximately the same as the lengths of the main magnet 11 and the auxiliary magnet 13 along the Y-axis direction, and the back yoke 14 and the main magnet 11 are disposed so that the positions of the end surfaces thereof along the positive Y-axis direction and the negative Y-axis direction approximately coincide.

The armature 20 is disposed so as to oppose the magnetic field system 10 along the Z-axis direction, via a predetermined air gap AG. In this example, the armature 20 is a movable element. The armature 20 is supported by a support mechanism, such as a slide rail, a linear guide, or the like, for example, and is movable in the X-axis direction. Thus, the armature 20 can move in the X-axis direction by a force magnetically acting between the armature 20 and the magnetic field system 10. The armature 20 may also be referred to as a coil (or winding) 21.

The coil 21 is formed by winding a conductor or wire, and an armature current supplied from a predetermined power supply flows through the coil 21. Thus, a thrust can be generated in the armature 20 including the coil 21, by the interlinking between the armature current and the magnetic flux generated by the magnetic field system 10 (or main magnet 11).

In the this example, the armature 20 has a coreless structure having no core (or iron core). Accordingly, an inertia of the armature 20 is relatively small, and as a result, it is possible to improve a response.

A plurality of coils 21 are provided, for example, and the linear motor 1 is driven by an alternating current (AC) armature currents having a plurality of phases. As illustrated in FIG. 1, for example, three coils 21 respectively corresponding to a U-phase, a V-phase, and a W-phase are integrally arranged adjacent to one another along the X-axis direction.

Magnetic Action of Magnetic Field System

Figure 3:
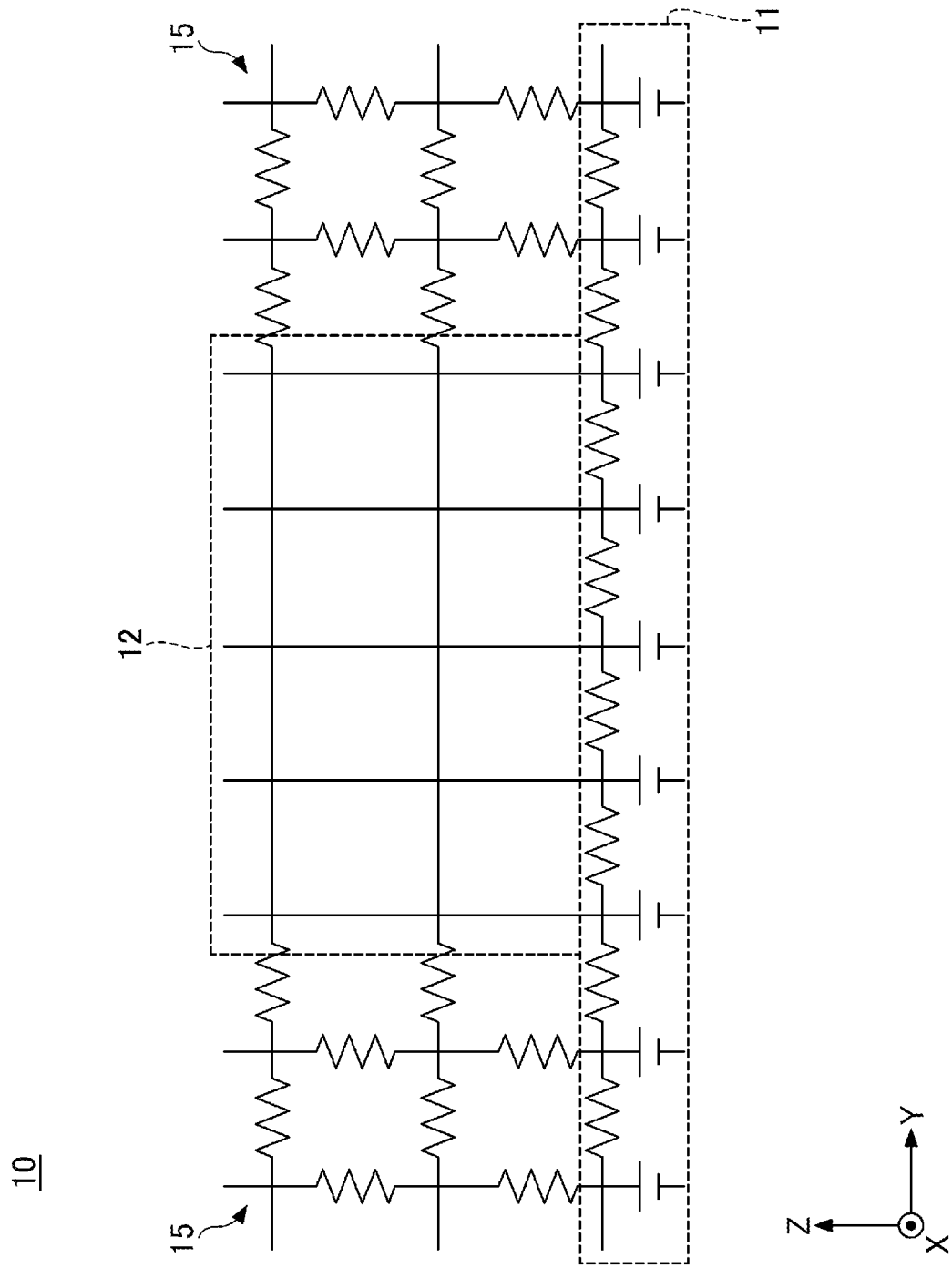
FIG. 3 is a magnetic circuit diagram schematically illustrating a magnetic action of the first example of the magnetic field system.

As illustrated in FIG. 3, because a magnetic permeability in the space 15 adjacent to the main magnet 11 along the positive Z-axis direction is relatively small at both end portions of the main magnet 11 along the Y-axis direction, a magnetoresistance thereof becomes relatively large regardless of the direction. The magnetic permeability of the space 15 refers to a magnetic permeability of air.

On the other hand, because the magnetic permeability of the soft magnetic member 12 adjacent to the main magnet 11 along the positive Z-axis direction is relatively large at a central portion of the main magnet 11 along the Y-axis direction, the magnetoresistance thereof becomes relatively small regardless of the direction.

Accordingly, as illustrated in FIG. 2, a magnetic flux MF of the magnetic pole at the end surface of the main magnet 11 along the positive Z-axis direction tends to pass through the soft magnetic member 12 having the relatively small magnetoresistance, the magnetic flux MF concentrates at the central portion along the Y-axis direction where the soft magnetic member 12 is provided. For this reason, it is possible to reduce a situation in which the magnetic flux of the main magnet 11 passes through the side surface of the soft magnetic member 12 along the Y-axis direction and becomes a leakage magnetic flux that does not interlink with the armature 20. As a result, it is possible to reduce the leakage magnetic flux of the main magnet 11, and improve the thrust of the linear motor 1.

Second Example of Linear Motor

Next, a second example of the linear motor 1 according to the present embodiment will be described, with reference to FIG. 4 through FIG. 6.

Figure 4:
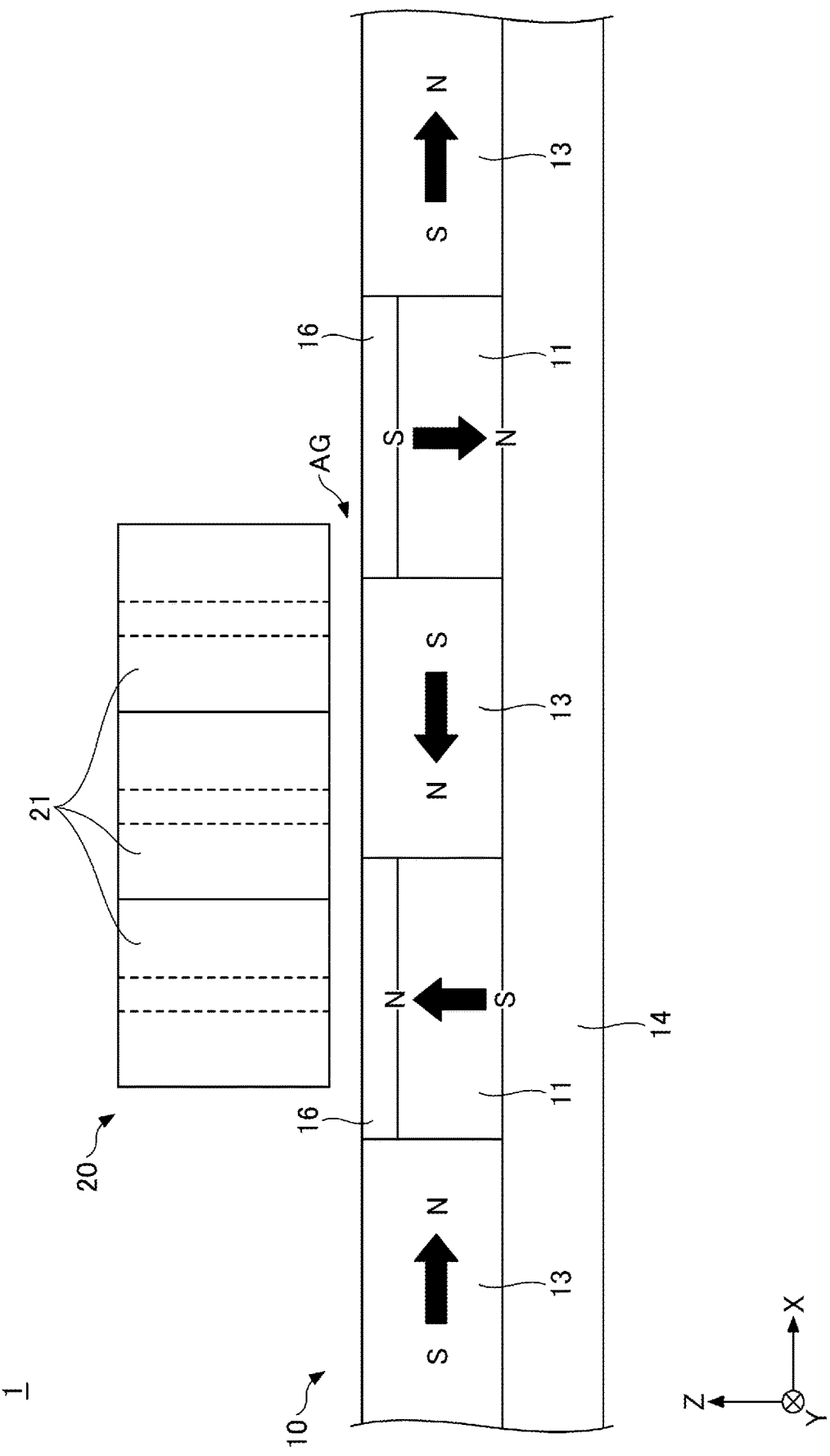
FIG. 4 is a side view illustrating a second example of the linear motor.

FIG. 4 is a side view illustrating the second example of the linear motor 1. FIG. 5 is a front cross sectional view illustrating a second example of the magnetic field system 10. FIG. 6 is a magnetic circuit diagram schematically illustrating the magnetic action of the second example of the magnetic field system 10.

Hereinafter, portions different from the first example described above will mainly be described, and a description of the same or corresponding contents as those of the first example described above may be omitted.

Configuration of Linear Motor

As illustrated in FIG. 4, the linear motor 1 includes the magnetic field system 10, and the armature 20, similar to the first example described above.

Figure 5:
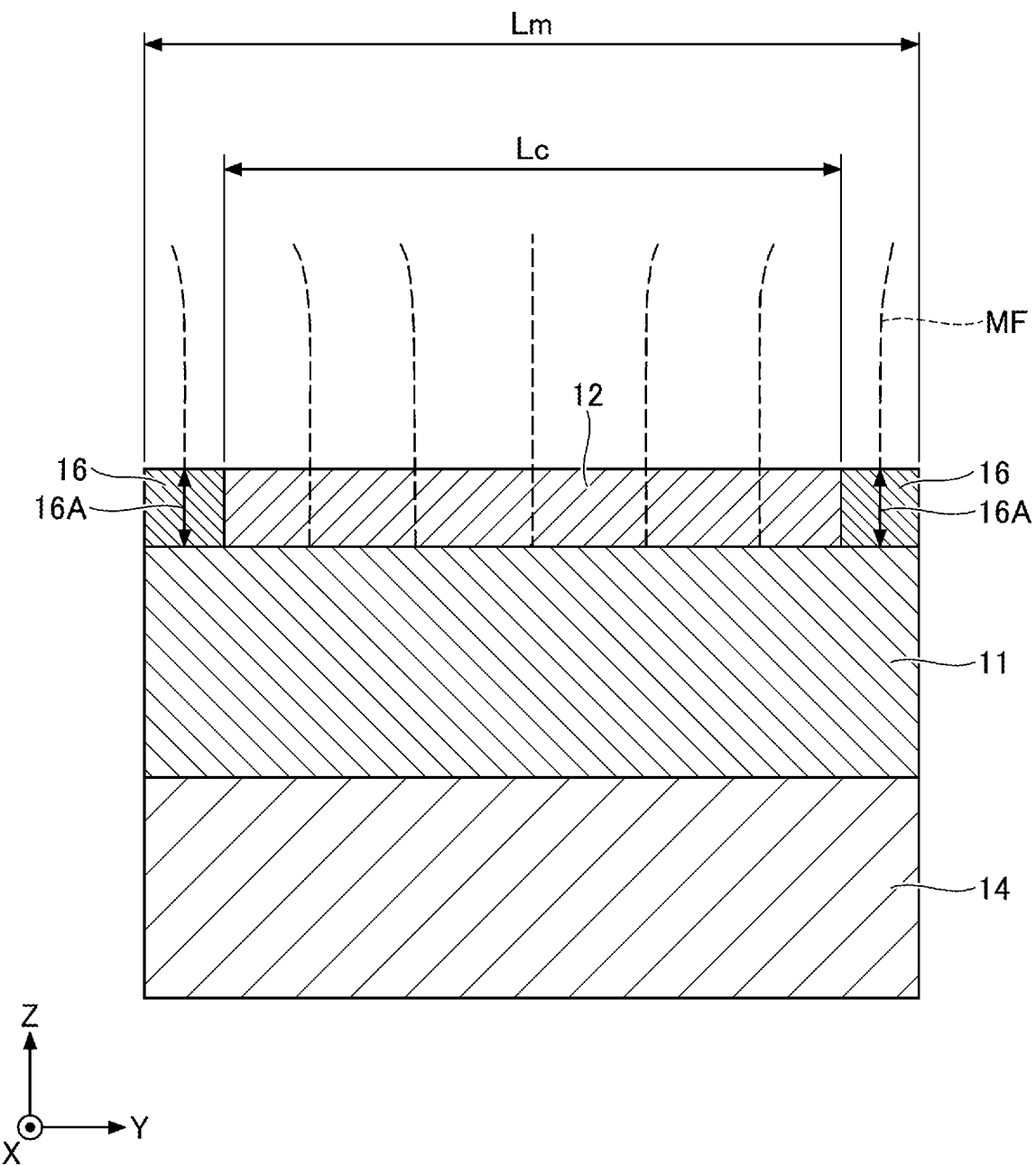
FIG. 5 is a front cross sectional view illustrating a second example of the magnetic field system.

As illustrated in FIG. 4 and FIG. 5, the magnetic field system 10 has a Halbach array, and includes the main magnet 11, the soft magnetic member 12, the auxiliary magnet 13, the back yoke 14, and grain-oriented electromagnetic steel plates 16.

The grain-oriented electromagnetic steel plates 16 are an example of a restricting part. The grain-oriented electromagnetic steel plate 16 is an electromagnetic steel plate having high magnetic properties only in one direction, that is, in an easy axis 16A (or axis of easy magnetization). The grain-oriented electromagnetic steel plates 16 are provided adjacent to both end surfaces of the soft magnetic member 12 along the positive Y-axis direction and the negative Y-axis direction, and the easy axis 16A extends approximately along the Z-axis direction, that is, along the magnetization direction of the main magnet 11. The grain-oriented electromagnetic steel plates 16 are provided adjacent to both end surfaces of the soft magnetic member 12 along the positive Y-axis direction and the negative Y-axis direction, are adjacent to the end surface of the main magnet 11 along the positive Z-axis direction, respectively. In other words, in this example, the grain-oriented electromagnetic steel plates 16 are disposed in the spaces 15 of the first example described above.

For example, the grain-oriented electromagnetic steel plate 16 has an approximately rectangular parallelepiped shape defined by sides extending along the X-axis, the Y-axis, and the Z-axis, respectively. As illustrated in FIG. 4, the grain-oriented electromagnetic steel plate 16 has a length along the X-axis direction that is approximately the same as those of the main magnet 11 and the soft magnetic member 12. The grain-oriented electromagnetic steel plates 16 are disposed so that positions of both end surfaces of the grain-oriented electromagnetic steel plates 16, the main magnet 11, and the soft magnetic member 12 along the positive X-axis direction and the negative X-axis direction approximately coincide with one another. Further, as illustrated in FIG. 5, the grain-oriented electromagnetic steel plates 16 adjacent to both end portions of the soft magnetic member 12 along the Y-axis direction respectively have a length that is approximately one-half of a difference (Lm−Lc) between the lengths of the main magnet 11 and the soft magnetic member 12 along the Y-axis direction, that is, (Lm−Lc)/2. The grain-oriented electromagnetic steel plates 16 adjacent to both end portions of the soft magnetic member 12 along the Y-axis direction are disposed so that end surfaces of the grain-oriented electromagnetic steel plates 16 on the outer side along the Y-axis direction approximately coincide with both end surfaces of the main magnet 11 along the Y-axis direction.

Magnetic Action of Magnetic Field System

Figure 6:
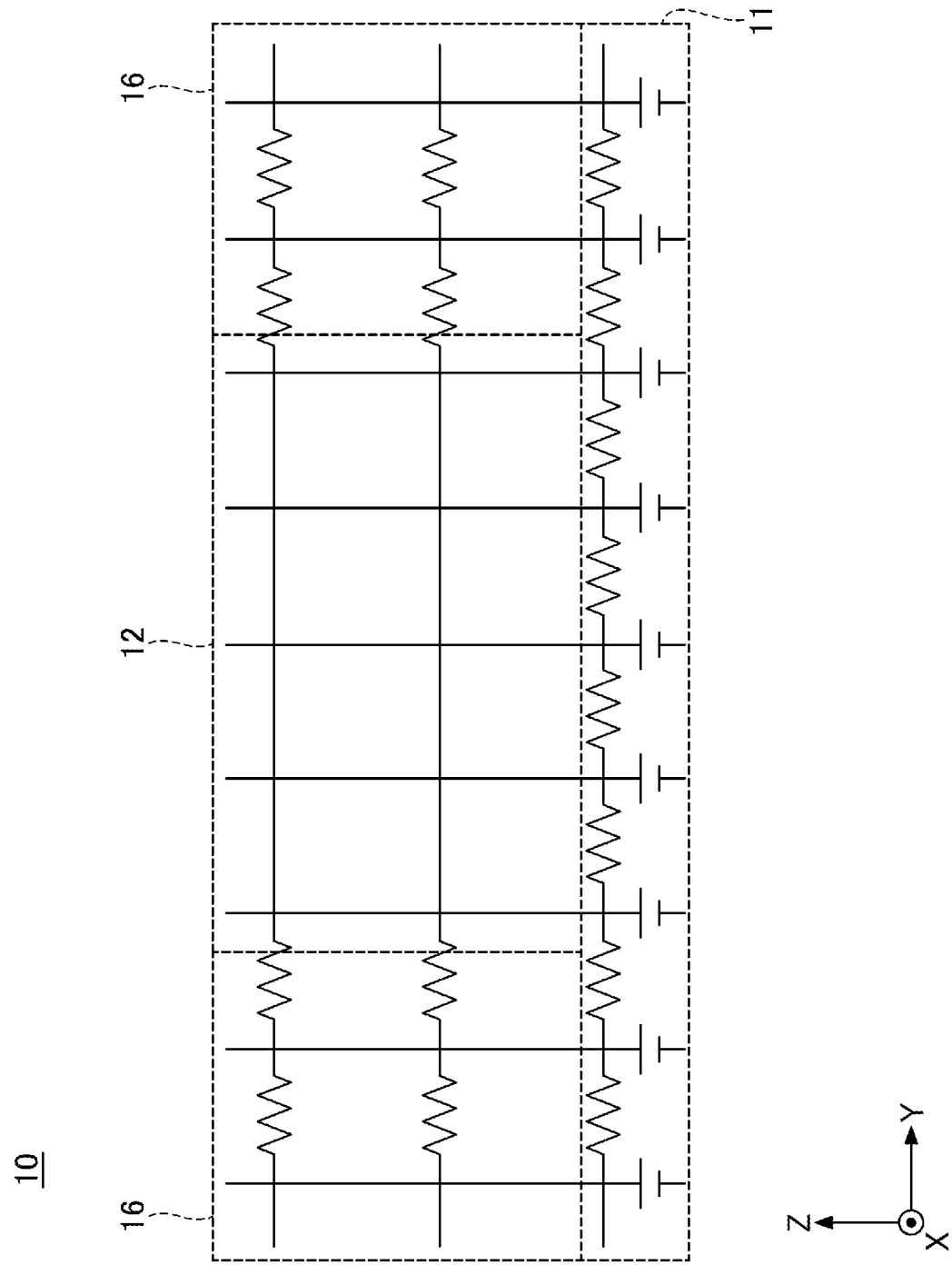
FIG. 6 is a magnetic circuit diagram schematically illustrating the magnetic action of the second example of the magnetic field system.

As illustrated in FIG. 6, the magnetoresistance of the grain-oriented electromagnetic steel plates 16 adjacent to the main magnet 11 along the positive Z-axis direction, at both end portions of the main magnets 11 along the Y-axis direction, is relatively small in the direction along the easy axis 16A, that is, along the Z-axis direction, while the magnetoresistance is relatively large in other directions, such as the Y-axis direction, for example.

Accordingly, at both end portions of the main magnet 11 along the Y-axis direction, the magnetic flux MF of the magnetic pole at the end surface of the main magnet 11 along the positive Z-axis direction passes in a direction in which the magnetoresistance of the grain-oriented electromagnetic steel plate 16 is relatively small, that is, in the Z-axis direction. For this reason, it is possible to reduce a situation in which the magnetic flux of the main magnet 11 passes through spatial regions in the positive Y-axis direction and the negative Y-axis direction of the soft magnetic member 12, to become the leakage magnetic flux not interlinking with the armature 20. In addition, at the central portion of the main magnet 11 along the Y-axis direction, the magnetic flux MF at the end surface of the main magnet 11 along the positive Z-axis direction does not pass through both end surfaces of the soft magnetic member 12 along the Y-axis direction, and easily passes through the soft magnetic member 12 in the Z-axis direction. Hence, it is possible to reduce the leakage magnetic flux of the main magnet 11, and improve the thrust of the linear motor 1.

Other Embodiments

The first and second examples of the embodiment described above may be appropriately varied or modified.

For example, in the first example described above, a member having a magnetoresistance larger than that of the soft magnetic member 12, that is, a member having a magnetic permeability smaller than that of the soft magnetic member 12, may be provided in the space 15. Such a member is an example of the restricting part, and may be made of a resin material or the like, for example.

In addition, for example, in the second example described above, the length of the soft magnetic member 12 along the Y-axis direction may be approximately the same as the length of the main magnet 11 along the Y-axis direction, and the soft magnetic member 12 may be disposed so that both end surfaces of the soft magnetic member 12 and the main magnet 11 along the positive Y-axis direction and the negative Y-axis direction, respectively, approximately coincide with each other. In the second example described above, the length of the soft magnetic member 12 along the Y-axis direction may be greater than the length of the main magnet 11 along the Y-axis direction. In these cases, the magnetic flux of the magnetic pole at the end surface of the main magnet 11 along the positive Z-axis direction does not pass through both end surfaces of the soft magnetic member 12 along the Y-axis direction, but easily passes through the soft magnetic member 12 along the Z-axis direction, due to the action of the grain-oriented electromagnetic steel plates 16 adjacent to both end surfaces of the soft magnetic member 12 along the Y-axis direction. For this reason, it is possible to reduce the leakage magnetic flux of the main magnet 11, and improve the thrust of the linear motor 1.

In addition, for example, in the second example and the modifications thereof described above, the soft magnetic member 12, configured as a grain-oriented electromagnetic steel plate having the easy axis extending approximately along the Z-axis direction, may be disposed in the region where the soft magnetic member 12 and the grain-oriented electromagnetic steel plate 16 are disposed. In this case, the soft magnetic member 12 is an example of the restricting part. In other words, instead of disposing the grain-oriented electromagnetic steel plates 16 adjacent only to both end portions of the main magnet 11 along the Y-axis direction, the soft magnetic member 12, configured as the grain-oriented electromagnetic steel plate, may be disposed adjacent to the main magnet 11 over the entire region of the main magnet 11 along the Y-axis direction.

Further, in the first example, the second example, and the modifications thereof described above, the armature 20 may have a structure including a core (iron core).

The configurations of the first example, the second example, and the modifications thereof described above may be employed in a linear motor in which the magnetic field system is the movable element, and the armature is the stator.

The configurations of the first example, the second example, and the modifications thereof described above may be employed in a linear motor in which the back yoke 14 is omitted.

The configurations of the first example, the second example, and the modifications thereof described above may be employed in a rotary motor (or dynamo-electric machine). In this case, the X-axis direction, the Y-axis direction, and the Z-axis direction in the first example, the second example, and the modifications thereof described above correspond to a circumferential direction, an axial direction, and a radial direction of the rotary motor, respectively.

Action

Next, the action of the linear motor 1 (or magnetic field system 10) according to the present embodiment will be described, with reference to FIG. 7 through FIG. 9.

Figure 7:
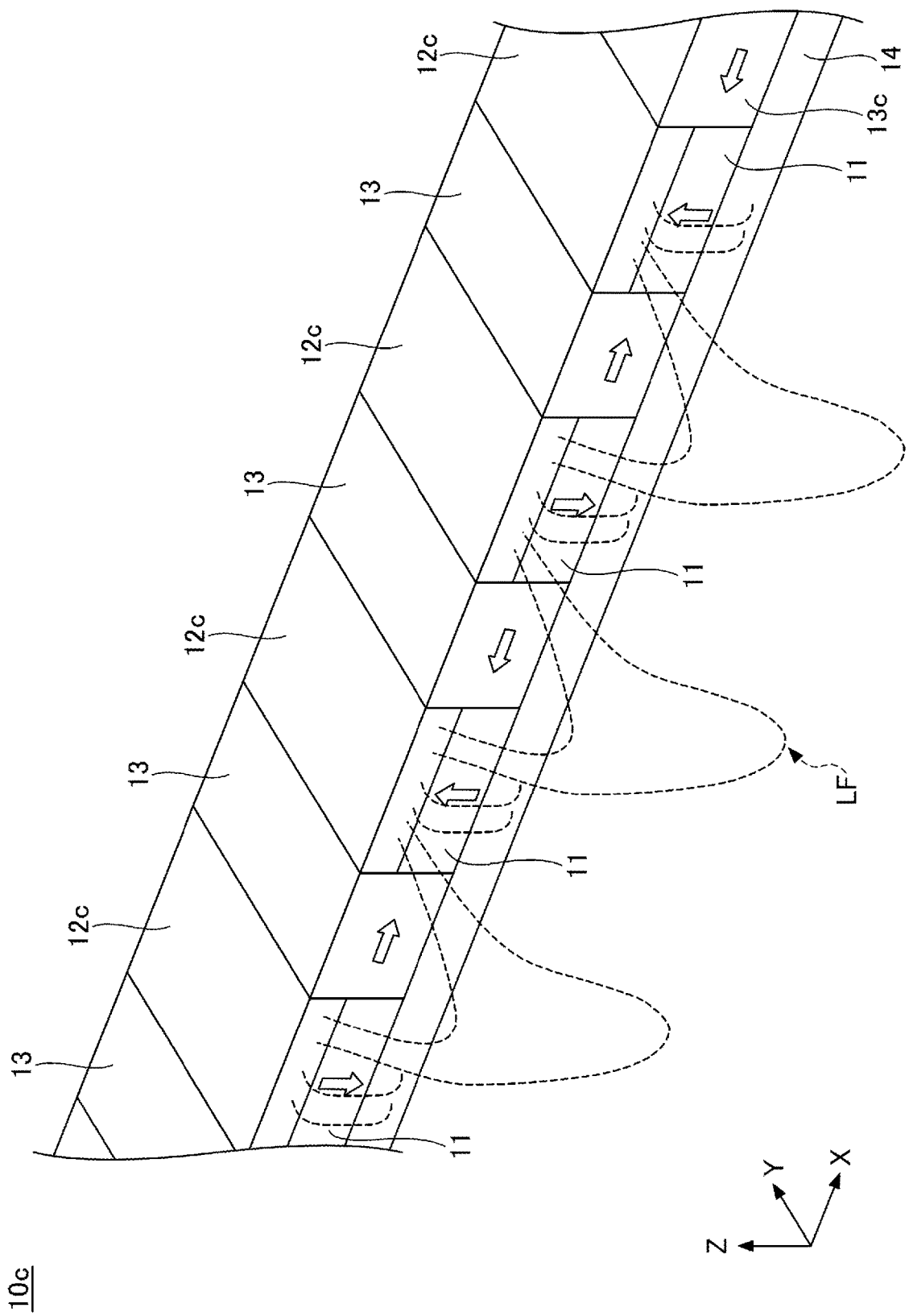
FIG. 7 is a perspective view illustrating a magnetic field system according to a comparative example.

FIG. 7 is a perspective view illustrating a magnetic field system 10c according to a comparative example. FIG. 8 is a front cross sectional view illustrating the magnetic field system 10c according to the comparative example. FIG. 9 is a magnetic circuit diagram schematically illustrating the magnetic action of the magnetic field system 10c according to the comparative example.

Figure 8:
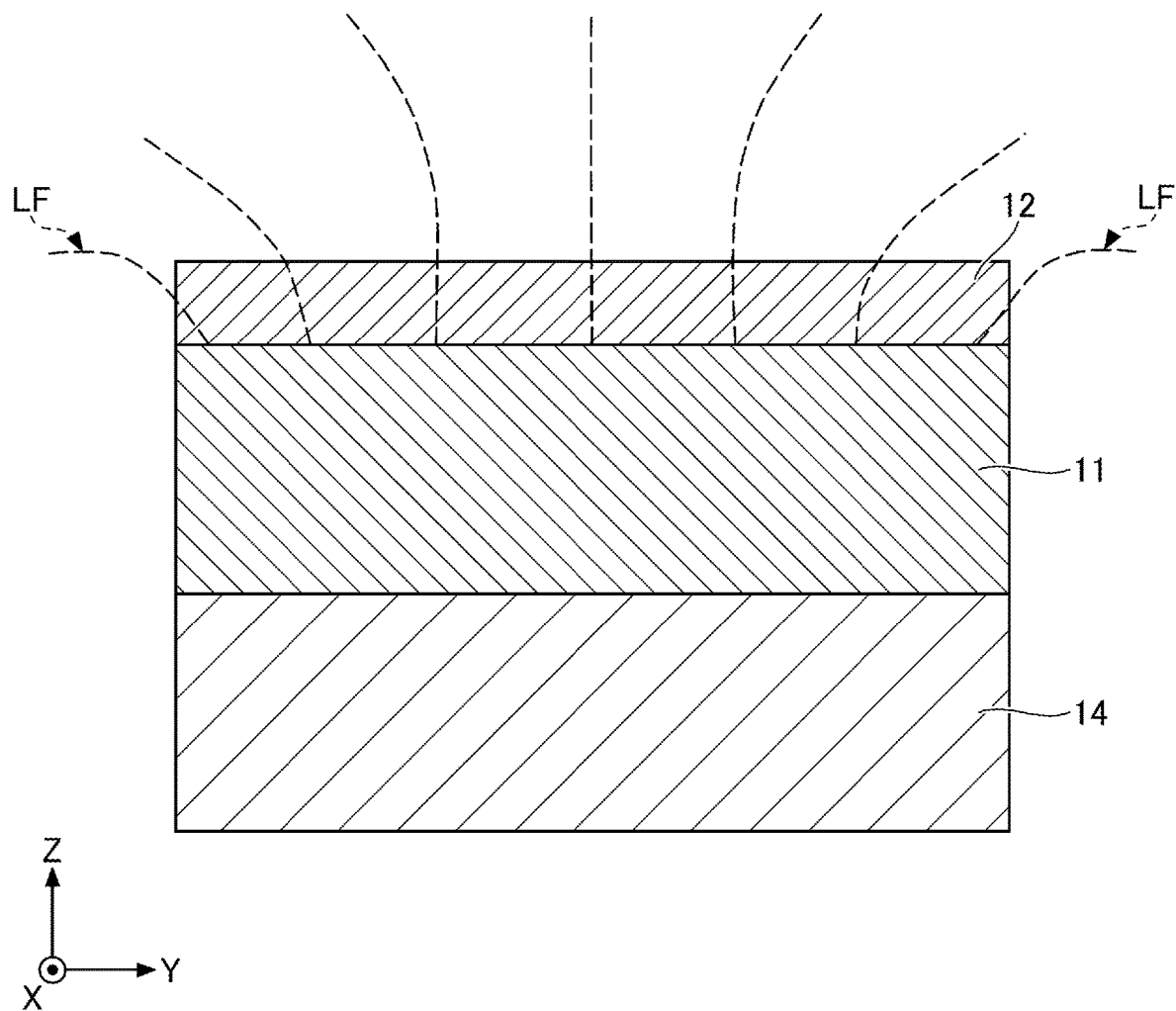
FIG. 8 is a front cross sectional view illustrating the magnetic field system according to the comparative example.

As illustrated in FIG. 7 and FIG. 8, the magnetic field system 10c according to the comparative example is different from the magnetic field system 10 according to the present embodiment, in that the soft magnetic member 12 is replaced with a soft magnetic member 12c and the spaces 15 and the grain-oriented electromagnetic steel plates 16 are not provided.

In the following description of the magnetic field system 10c according to the comparative example, the same constituent elements as those of the magnetic field system 10 according to the present embodiment are designated by the same reference numerals, and a repeated description of the magnetic field system 10 according to the present embodiment may be omitted.

As illustrated in FIG. 7 and FIG. 8, the soft magnetic member 12c is made of a soft magnetic material. A number of soft magnetic members 12, identical to the number of main magnets 11, are provided. The soft magnetic members 12 are disposed adjacent to the end surfaces of the main magnets 11 along the positive Z-axis direction, respectively.

The soft magnetic member 12c has an approximately rectangular parallelepiped shape defined by sides extending along the X-axis, the Y-axis, and the Z-axis, respectively. As illustrated in FIG. 7 and FIG. 8, the length of the soft magnetic members 12c along the X-axis direction is approximately the same as that of the main magnet 11. In addition, the soft magnetic member 12c is disposed so that the positions of both end surfaces of the main magnet 11 and the soft magnetic member 12c along the positive X-axis direction and the negative X-axis direction, respectively, approximately coincide with each other along the X-axis direction. Further, the length Lc of the soft magnetic member 12c along the Y-axis direction is approximately the same as that of the main magnet 11, and the soft magnetic member 12c is disposed so that the positions of both end surfaces of the main magnet 11 and the soft magnetic member 12c along the positive Y-axis direction and the negative Y-axis direction, respectively, approximately coincide with each other along the Y-axis direction.

As illustrated in FIG. 9, because the magnetoresistance of the soft magnetic member 12c is relatively small regardless of the direction, the magnetic flux of the magnetic pole located at both end portions of the main magnet 11 along the Y-axis direction, among the magnetic poles at the end surfaces of the main magnet 11 along the positive Z-axis direction, may greatly deviate from the Z-axis direction. For this reason, as illustrated in FIG. 7 and FIG. 8, a leakage flux LF, that passes through both end surfaces of the soft magnetic member 12c along the Y-axis direction, and does not interlink with the armature 20, is easily generated. As a result, the thrust of the linear motor may decrease, the effect thereof may become relatively large, particularly when the armature 20 having the coreless structure is used.

On the other hand, in the present embodiment, the magnetic field system 10 includes the main magnet 11, the soft magnetic member 12, the auxiliary magnet 13, and the restricting part, such as the space 15 or the grain-oriented electromagnetic steel plate 16, for example. More particularly, the main magnet 11 generates the magnetic field with respect to the armature 20. The soft magnetic member 12 is disposed adjacent to the end surface of the main magnet 11 on a side opposing the armature 20, that is, in the positive Z-axis direction, and is formed of the soft magnetic material. In addition, the auxiliary magnet 13 is adjacent to the relative moving direction, that is, the X-axis direction, between the magnetic field system 10 and the armature 20, with respect to the main magnet 11 and the soft magnetic member 12, and enhances the magnetic pole at the end surface of the main magnet 11 on the side opposing the armature 20. Further, the restricting part reduces the leakage magnetic flux generated through the soft magnetic member 12, that is, the magnetic flux of the main magnet 11 passing through the end surface of the soft magnetic member 12 along the Y-axis direction perpendicular to both the Z-axis direction in which the main magnet 11 and the armature 20 oppose each other, and the X-axis direction corresponding to the relative moving direction between the magnetic field system 10 and the armature 20.

Hence, the magnetic field system 10 can further improve the thrust of the linear motor 1 and the torque of the rotary motor.

In addition, in the present embodiment, the restricting part may be provided adjacent to the end portion of the soft magnetic member 12 along the Y-axis direction, and to the end portion of the main magnet 11 along the Z-axis direction. Further, the magnetoresistance of the restricting part may be larger than that of the soft magnetic member 12.

Accordingly, the magnetic field system 10 can concentrate the magnetic flux of the magnetic pole at the end portion adjacent to the soft magnetic member 12 of the main magnet 11 along the positive Z-axis direction to the central portion along the Y-axis direction within a range in which the main magnet 11 is present, so as to pass through the soft magnetic member 12 having a magnetoresistance smaller than that of the restricting part. For this reason, the magnetic field system 10 can reduce the leakage magnetic flux, and further improve the thrust of the linear motor 1 and the torque of the rotary motor.

In the present embodiment, the restricting part may be the spaces 15 in which no member is provided (that is, free of any member).

Thus, the leakage magnetic flux can be reduced by simply reducing the length of the soft magnetic member 12 along the Y-axis direction. For this reason, the magnetic field system 10 can improve the thrust of the linear motor 1 and the torque of the rotary motor using a simple configuration, and can reduce an increase in cost that would otherwise occur if additional components, additional manufacturing processes, or the like were used.

Moreover, in the present embodiment, the restricting part may be provided adjacent to the end portion of the soft magnetic member 12 along the Y-axis direction, and the magnetoresistance of the restricting part in the Y-axis direction may be larger than the magnetoresistance of the restricting part in the Z-axis direction.

Accordingly, the magnetic field system 10 can restrict the magnetic flux of the main magnet 11 in a direction that does not pass through the end surface of the soft magnetic member 12 along the Y-axis direction, that is, in the Z-axis direction (or a direction relatively close to the Z-axis direction) by the action of the restricting part having relatively large magnetoresistance in the Y-axis direction. For this reason, the magnetic field system 10 can reduce the leakage magnetic flux, and further improve the thrust of the linear motor 1 and the torque of the rotary motor.

In the present embodiment, the end surface of the soft magnetic member 12 along the Y-axis direction may be located approximately at the same position as the end surface of the main magnet 11 along the Y-axis direction, or may be located on the inner side of the end surface of the main magnet 11 along the Y-axis direction.

Accordingly, the magnetic field system 10 can restrict, to an extent possible, the magnetic flux of the main magnet 11 passing through the soft magnetic member 12 within a range of the width of the main magnet 11 along the Y-axis direction. Hence, according to the magnetic field system 10, the magnetic flux passing through the soft magnetic member 12 easily interlinks with the armature 20, and it is possible to further improve the thrust of the linear motor 1 and the torque of the rotary motor.

In the present embodiment, the restricting part may be the soft magnetic member 12. Further, the magnetoresistance of the soft magnetic member 12 in the Y-axis direction may be larger than the magnetoresistance of the soft magnetic member 12 in the Z-axis direction.

Thus, the magnetic field system 10 can restrict the magnetic flux passing through the soft magnetic member 12 to the Z-axis direction (or the direction relatively close to the Z-axis direction). For this reason, the magnetic field system 10 can reduce the leakage magnetic flux, and further improve the thrust of the linear motor 1 and the torque of the rotary motor.

Moreover, in the present embodiment, the restricting part may be famed by the grain-oriented electromagnetic steel plate (for example, the grain-oriented electromagnetic steel plate used as the grain-oriented electromagnetic steel plate 16 or the soft magnetic member 12) disposed so that the easy axis extends in the Z-axis direction.

Accordingly, the magnetic field system 10 can realize a restricting part having properties such that the magnetoresistance in the Y-axis direction is larger than the magnetoresistance in the Z-axis direction.

In the present embodiment, the armature 20 may have the coreless structure.

Hence, it is possible to improve the thrust of the linear motor 1, and the torque of the rotary motor, respectively using the armature 20 having the coreless structure.

According to each of the embodiments described above, it is possible to provide a technique capable of further improving the torque and thrust of a motor.

Although the examples are numbered with, for example, "first," or "second," the ordinal numbers do not imply priorities of the examples. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A magnetic field apparatus comprising:
    a main magnet configured to generate a magnetic field with respect to an armature;
    a predetermined member, made of a soft magnetic material, and disposed adjacent to an end surface of the main magnet on a side opposing the armature;
    an auxiliary magnet, configured to increase a magnetic flux of a magnetic pole of the main magnet on the side opposing the armature, and disposed adjacent to the main magnet and the predetermined member in a relative moving direction between the magnetic field apparatus and the armature; and
    a restricting part configured to restrict the magnetic flux of the main magnet passing through an end surface of the predetermined member along a third direction that is perpendicular to both a first direction in which the main magnet and the armature oppose each other, and a second direction corresponding to the relative moving direction between the magnetic field apparatus and the armature.

2. The magnetic field apparatus as claimed in claim 1, wherein
    the restricting part is provided adjacent to an end portion of the predetermined member along the third direction, and adjacent to an end portion of the main magnet along the first direction, and
    the restricting part has a magnetoresistance larger than a magnetoresistance of the predetermined member.

3. The magnetic field apparatus as claimed in claim 2, wherein the restricting part is famed by a space that is free of any member.

4. The magnetic field apparatus as claimed in claim 2, wherein
    the restricting part is provided adjacent to the end portion of the predetermined member along the third direction, and
    the magnetoresistance of the restricting part in the third direction is larger than the magnetoresistance of the restricting part in the first direction.

5. The magnetic field apparatus as claimed in claim 4, wherein the end surface of the predetermined member along the third direction is located one of (a) approximately at a same position as an end surface of the main magnet along the third direction, and (b) on an inner side of the end surface of the main magnet along the third direction.

6. The magnetic field apparatus as claimed in claim 1, wherein
    the restricting part is formed by the predetermined member, and
    a magnetoresistance of the predetermined member in the third direction larger than a magnetoresistance of the predetermined member in the first direction.

7. The magnetic field apparatus as claimed in claim 4, wherein the restricting part is famed by a grain-oriented electromagnetic steel plate that is disposed so that an easy axis extends in the first direction.

8. A linear motor comprising:
    the magnetic field apparatus as claimed in claimed 1; and
    the armature.

9. The linear motor as claimed in claim 8, wherein the armature has a coreless structure.

* * * * *